(12) United States Patent
Tazzia et al.

(10) Patent No.: US 7,374,686 B2
(45) Date of Patent: May 20, 2008

(54) ELECTROCOAT MANUFACTURING PROCESS

(75) Inventors: Charles L. Tazzia, Grosse Pointe Farms, MI (US); Robert D. Schiller, South Lyon, MI (US); Frankie L. Dock, Detroit, MI (US); Robert Doty, Belleville, MI (US)

(73) Assignee: BASF Corporation, Southfield, MI (US)

( * ) Notice: Subject to any disclaimer, the term of this patent is extended or adjusted under 35 U.S.C. 154(b) by 109 days.

(21) Appl. No.: 11/279,260

(22) Filed: Apr. 11, 2006

(65) Prior Publication Data

US 2007/0235318 A1    Oct. 11, 2007

(51) Int. Cl.
*B01D 61/00* (2006.01)
*B01D 21/00* (2006.01)

(52) U.S. Cl. .................. 210/651; 210/180; 203/47
(58) Field of Classification Search ................ 210/180, 210/650–651; 203/47; 525/412
See application file for complete search history.

(56) References Cited

U.S. PATENT DOCUMENTS

| | | | | |
|---|---|---|---|---|
| 3,663,405 | A * | 5/1972 | Christenson et al. | 204/482 |
| 4,222,837 | A * | 9/1980 | Hazan | 204/482 |
| 4,579,889 | A * | 4/1986 | Kaffen et al. | 523/414 |
| 4,581,111 | A * | 4/1986 | Christenson et al. | 204/518 |
| 4,915,797 | A * | 4/1990 | Vigezzi et al. | 205/138 |
| 4,994,507 | A * | 2/1991 | Debroy et al. | 523/415 |
| 5,114,554 | A | 5/1992 | Voss et al. | |
| 5,430,078 | A * | 7/1995 | Hoppe-Hoeffler et al. | 523/414 |
| 6,190,523 | B1 * | 2/2001 | Tazzia | 204/484 |
| 6,214,470 | B1 * | 4/2001 | Tazzia et al. | 428/425.8 |
| 6,951,602 | B1 * | 10/2005 | Reuter et al. | 204/489 |
| 6,960,667 | B2 * | 11/2005 | Kunimoto et al. | 548/545 |
| 7,008,998 | B2 * | 3/2006 | Tazzia et al. | 524/800 |
| 7,179,376 | B2 * | 2/2007 | Kaleem et al. | 210/195.2 |
| 2003/0010639 | A1 | 1/2003 | Legatski et al. | |

FOREIGN PATENT DOCUMENTS

| | | |
|---|---|---|
| EP | 0318827 B1 | 11/1988 |
| EP | 0318827 A2 | 6/1989 |
| GB | 1419103 | 12/1975 |
| JP | 52049248 | 4/1977 |
| JP | 59041498 A | 3/1984 |
| JP | 60204898 A | 10/1985 |
| JP | 63176499 A | 7/1988 |
| JP | 4358097 A | 12/1992 |

OTHER PUBLICATIONS

ESP@Cenet Document View, English Abstract for JP4358097, Nitto Denko Corp., Dec. 11, 1992.
ESP@Cenet Document View, English Abstract for JP63176499, Fujimaki Hideo, Jul. 20, 1988.
ESP@Cenet Document View, English Abstract for JP 60204898, Tada Naoki et al, Oct. 16, 1985.
ESP@Cenet Document View, English Abstract for JP 59041498, Oono Fumio Nitto Electric Co. Mar. 7, 1984.
ESP@Cenet Document View, English Abstract for JP 59049248, Itou Masuzou et al., Apr. 20, 1977.
Patent Abstract of Japan for JP 55006452, Hashiguchi Yoshiharu et al, Jan. 17, 1980.

* cited by examiner

*Primary Examiner*—Ana M Fortuna

(57) ABSTRACT

The present invention provides a method of preparing an electrocoat coating composition, comprising forming an aqueous emulsion comprising a film-forming component and water and removing at least a portion of the water from the aqueous emulsion by ultrafiltration.

11 Claims, No Drawings

ELECTROCOAT MANUFACTURING PROCESS

FIELD OF THE DISCLOSURE

The invention relates methods for preparing electrocoat coating compositions used in electrodeposition of coatings onto a conductive substrate, in particular preparation of concentrates for preparing or replenishing electrocoat baths.

BACKGROUND OF THE DISCLOSURE

The statements in this section merely provide background information related to the present disclosure and may not constitute prior art.

Industrial coating of metal articles that will be used in corrosive environments may include application of one or more inorganic and organic treatments and coatings. Steel automotive vehicle bodies and parts, for instance, have an aqueous phosphate coating material applied, are rinsed with rinse water after phosphating, then have an aqueous electrodeposition (or electrocoat) coating applied, followed by multiple aqueous rinses before the electrodeposited coating is cured in an oven.

Electrodeposition coating compositions and methods are widely used in industry today. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness.

Electrocoat baths usually comprise an aqueous dispersion of a principal film-forming polymer or resin (which terms are used interchangeably), such as an acrylic or epoxy resin, having ionic stabilization. In automotive or industrial applications for which hard electrocoat films are desired, the electrocoat compositions are formulated to be curable compositions. This is usually accomplished by including in the bath a crosslinking agent that can react with functional groups on the principal resin under appropriate conditions (such as with the application of heat) and thus cure the coating. During electrodeposition, coating material containing an ionically-charged resin having a relatively low molecular weight is deposited onto a conductive substrate by submerging the substrate in an electrocoat bath having dispersed therein the charged resin and then applying an electrical potential between the substrate and a pole of opposite charge, for example, a stainless steel electrode. The charged coating material migrates to and deposits on the conductive substrate. The coated substrate is then heated to cure the coating.

As the resins and pigments are plated from the electrocoat coating bath, the bath must be replenished by adding more of the resins and pigments. In one case, resin concentrate and pigment dispersion concentrate are added separately; in another case, a pigmented resin concentrate is added. In both cases, it is beneficial to supply the concentrates with a reasonably low amount of water. The solids content of the concentrate depends on the viscosity profile of the concentrate, but in general the solids content may be raised to 40 to 55 percent by weight nonvolatiles. In general, the solids content is selected to reduce the volume of material to the extent feasible and/or to ensure stability of the dispersed pigment.

On the other hand, manufacturing the resin emulsion is facilitated by including more water that would be desirable in the emulsion concentrate or pigmented emulsion concentrate. For instance, it is desirable to have an excess of water in making the emulsion for azeotropically distilling out certain low-boiling organic solvents. Such low-boiling organic compounds are used as solvents and liquid media in preparation of the components used in electrocoat baths, for example in preparing the film-forming resins and crosslinking agents. Organic solutions of the electrocoat components are dispersed or emulsified in water. (The terms "emulsion" and "dispersion" are being used interchangeably to refer to such waterborne organic components.)

The volatile organic compounds and excess water may then be removed by vacuum distillation at an elevated temperature, for example from at 100-120° F., with agitation or circulation. This process requires that the emulsions be held at the elevated temperatures for lengthy times, particularly because the removal rate of the volatile organic compounds slows as the emulsion becomes more concentrated from removal of both volatile organic compounds and water. The vacuum distillation is continued until the electrocoat resin emulsion reaches a desired solids concentration, adding significant heat history to the product.

The process of concentrating the unpigmented electrocoat emulsion, however, is lengthy and costly. The vacuum distillation may take 25 or 30 hours, tying up equipment and increasing production costs. It would thus be desirable to introduce an improved way of concentrating electrocoat emulsions by removing water during production of electrocoat compositions.

SUMMARY OF THE DISCLOSURE

The present disclosure describes methods of manufacturing an electrocoat coating composition, in which an aqueous emulsion of a film-forming component is concentrated by removal of water by ultrafiltration.

In particular embodiments, the method may further comprise circulating the permeate from removal of water through a reverse osmosis membrane to separate pure water and to concentrate higher boiling cosolvents and/or low molecular weight conductive species. The latter can be added back into the emulsion, while the pure water can be used in producing further electrocoat emulsion.

In certain embodiments, the method may include forming an aqueous emulsion comprising a film-forming component and a volatile organic compound, stripping at least a portion of the organic compound from the emulsion by distillation, and then removing a portion of water by ultrafiltration.

In an embodiment of the invention, the emulsion includes an amine-functional resin at least partially neutralized by an acid. The emulsion is subjected to ultrafiltration to remove a portion of the water to concentrate the emulsion.

"A" and "an" as used herein indicate "at least one" of the item is present; a plurality of such items may be present, when possible. Other than in the working examples provides at the end of the detailed description, all numerical values of parameters (e.g., of quantities or conditions) in this specification, including the appended claims, are to be understood as being modified in all instances by the term "about." "About" when applied to values indicates that the calculation or the measurement allows some slight imprecision in the value (with some approach to exactness in the value;

approximately or reasonably close to the value; nearly). If the imprecision provided by "about" is not otherwise understood in the art with this ordinary meaning, then "about" as used herein indicates at least variations that may arise from ordinary methods of measuring such parameters.

Further areas of applicability will become apparent flow the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An electrocoat composition is prepared by making an aqueous emulsion that includes a film-forming component, such as a polymer or resin. A variety of such resins are known, including without limitation, acrylic, polyester, epoxy, and polybutadiene resins. Preferably, the principal resin is cathodic, i.e., it has salted basic or quaternary groups (e.g., ammonium, sulfonium, or phosphonium groups). In a cathodic electrocoating process, the article to be coated is the cathode. Water-dispersible resins used in the cathodic electrodeposition coating process have a cationic functional group such as primary, secondary, tertiary, and/or quaternary amine moiety as a positively chargeable hydrophilic group.

In a preferred embodiment, the resin is an epoxy resin functionalized with amine groups. Preferably, the epoxy resin is prepared from a polyglycidyl ether. Preferably, the polyglycidyl ether of is the polyglycidyl ether of bisphenol A or similar polyphenols. It may also be advantageous to extend the epoxy resin by reacting an excess of epoxide group equivalents with a modifying material, such as a polyol, a polyamine or a polycarboxylic acid, in order to improve the film properties. Preferably, the polyglycidyl ether is extended with bisphenol A. Useful epoxy resins of this kind have a weight average molecular weight, which can be determined by GPC, of from about 3000 to about 6000. Epoxy equivalent weights can range from about 200 to about 2500, and are preferably from about 500 to about 1500.

Amino groups can be incorporated by reacting the polyglycidyl ethers of the polyphenols with amine or polyamines. Typical amines and polyamines include, without limitation, dibutylamine, ethylenediamine, diethylenetriamine, triethylenetetramine, dimethylaminopropylamine, dimethylaminobutylamine, diethylaminopropylamine, diethylaminobutylamine, dipropylamine, and similar compounds, and combinations thereof. In a preferred embodiment, the epoxide groups on the epoxy resin are reacted with a compound comprising a secondary amine group and at least one latent primary amine. The latent primary amine group is preferably a ketimine group. The primary amines are regenerated when the resin is emulsified.

Quaternary ammonium groups may be incorporated, and are formed, for example, from a tertiary amine by salting it with an acid, then reacting the salting hydrogen with, e.g., a compound bearing an epoxide group to produce an ammonium group. Resins used according to the invention preferably have a primary amine equivalent weight of about 300 to about 3000, and more preferably of about 850 to about 1300.

Epoxy-modified novolacs can be used as the resin in the present invention. The epoxy-novolac resin can be capped in the same way as previously described for the epoxy resin.

Cationic polyurethanes and polyesters may also be used. Such materials may be prepared by endcapping with, for example, an aminoalcohol or, in the case of the polyurethane, the same compound comprising a saltable amine group previously described may also be useful.

Polybutadiene, polyisoprene, or other epoxy-modified rubber-based polymers can be used as the resin in the present invention. The epoxy-rubber can be capped with a compound comprising a saltable amine group.

In an alternative embodiment, cationic or anionic acrylic resins may be used. In the case of a cationic acrylic resin, the resin is polymerized using N,N'-dimethylaminoethyl methacrylate, tert-butylaminoethyl methacrylate, 2-vinylpyridine, 4-vinylpyridine, vinylpyrrolidine or other such amino monomers. In the case of an anionic acrylic resin, the resin is polymerized using acrylic acid, methacrylic acid, crotonic acid, maleic acid, fumaric acid, crotonic acid, isocrotonic acid, vinylacetic acid, and itaconic acid, anhydrides of these acids, or other suitable acid monomers or anhydride monomers that will generate an acid group for salting. The polymerization also includes a hydroxyl-functional monomer. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms. The monomer bearing the hydroxyl group and the monomer bearing the group for salting (amine for a cationic group or acid or anhydride for anionic group) may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

Acrylic polymers may be made cathodic by incorporation of amino-containing monomers, such as acrylamide, methacrylamide, dimethyl amino ethyl methacrylate or t-butyl amino ethyl methacrylate. Alternatively, epoxy groups may be incorporated by including an epoxy-functional monomer in the polymerization reaction. Such epoxy-functional acrylic polymers may be made cathodic by reaction of the epoxy groups with amines according to the methods previously described for the epoxy resins. The molecular weight of a typical acrylic resin is usually in the range from about 2000 to about 50,000, and preferably from about 3000 to about 15,000.

The amino equivalent weight of the cationic resin can range from about 150 to about 5000, and preferably from about 500 to about 2000. The hydroxyl equivalent weight of the resins, if they have hydroxyl groups, is generally between about 150 and about 2000, and preferably about 200 to about 800.

The resin is typically formed as a solution in an organic solvent. The solvent may be one or more solvents suitable for dissolving or processing the resin. Typically, the resin is prepared in solvent by polymerization. Nonlimiting examples of suitable solvents include aromatic solvents such as toluene and xylene, ketones such as methyl ethyl ketone, methyl propyl ketone, methyl isobutyl ketone, alcohols such as diethylene glycol, esters such as butyl acetate, hexyl acetate, and alkylene glycol ethers and alkylene glycol ether esters such as ethylene glycol monobutyl ether, propylene glycol monophenyl ether, propylene glycol monopropyl ether diethylene glycol butyl ether, propylene glycol butyl ether, the acetates of these alkylene glycol ethers, and so on. The organic solvents may be used singly or in combination.

In general, the resin solution may have from about 10% to about 90% by weight organic solvent, typically from about 20% to about 50% by weight organic solvent. Typically, the solvent will include compounds such as the alkylene glycol ethers and alkylene glycol ether esters that are desirably left in the electrocoat coating formulation as stabilizing and/or coalescing cosolvents and other compounds such as aromatic solvents, ketones, and/or alcohols that are desirably removed from the electrocoat coating formulation.

The resin or resin solution is emulsified in water in the presence of a salting compound. When the resin has basic groups, such as amine groups, the resin is salted with an acid; when the resin has acid groups, the resin is salted with a base. Usually, the principal resin and the crosslinking agent are blended together before the resins are dispersed in the water. In a preferred embodiment, the resin groups are amine groups and are salted with an acid such as phosphoric acid, propionic acid, acetic acid, lactic acid, or citric acid. The salting acid may be blended with the resin or resins, mixed with the water, or both, before the resins are added to the water. The acid is used in an amount sufficient to neutralize enough of the amine groups of the principal resin to impart water-dispersability to the resin. The resin may be fully neutralized; however, partial neutralization is usually sufficient to impart the required water-dispersability. By "partial neutralization" we mean that at least one, but less than all, of the saltable groups on the resin are neutralized. By saying that the resin is at least partially neutralized, we mean that at least one of the saltable groups on the resin is neutralized, and up to all of such groups may be neutralized. The degree of neutralization that is required to afford the requisite water-dispersability for a particular resin will depend upon its chemical composition, molecular weight, and other such factors and can readily be determined by one of ordinary skill in the art through straightforward experimentation.

Similarly, the acid groups of an anionic resin are salted with an amine such as dimethylethanolamine or trietheylamine. Again, the salting agent (in this case, an amine) may be blended with the resins, mixed with the water, or both, before the resins are added to the water. The resin is at least partially neutralized, but may be fully neutralized. At least enough acid groups are salted with the amine to impart water-dispersability to the resin.

As mentioned, the saltable resin may be combined with a crosslinking agent before being dispersed in water. Crosslinking agents suitable for principle resins having particular functionalities are known in the art, and may be used singly or in combination. Of particular note are blocked polyisocyanates.

At least a part, preferably substantially all, of the volatile organic solvent used in synthesis and processing solvent (excepting high boiling, cosolvent organic liquids that desirably remain in the aqueous coating composition) is removed by distillation, preferably vacuum distillation. In general, all solvents not higher boiling, cosolvents that contribute to coalescence and stability (e.g., glycol ethers and glycol ether esters) are removed. The distillate will include water, which may be replaced periodically during distillation, for example to maintain a desired viscosity and/or rate of azeotropic solvent removal. Preferably distillation is continued only so long as a substantial portion of volatile, non-cosolvent solvent is being removed. The electrocoat emulsion is cooled after a desired amount of the organic solvent has been removed.

In the method of manufacturing an electrocoat coating composition, the electrocoat emulsion is concentrated by removing additional water by ultrafiltration. The process uses cross flow filtration in which the average pore diameter of the membrane is from about 0.005 microns to 0.5 microns. The resin emulsion is circulated through a membrane filtration cell. Water is removed as permeate. The emulsion is concentrated by the removal of the water. The permeate of water, which may also contain high boiling organic solvents that remain after the distillation step and ionic species, may be circulated through a reverse osmosis membrane to separate purified water, which can then be re-used in the emulsification process. Reverse osmosis is a high pressure, separation technique using a membrane with pore sizes generally less than 0.001 micron. The concentrated, high boiling cosolvent fraction, including any low molecular weight conductive species, may be added back into the electrocoat emulsion.

The concentrated electrocoat emulsion may be used to adjust the composition of an electrocoat bath, as would be needed if the resin-to-pigment ratio should vary from ideal due to plating from the bath. Alternatively, manufacture of a pigmented electrocoat coating concentrate is continued by adding pigment dispersion and any further desired materials such as coalescing aids, antifoaming aids, and other additives. A pigmented concentrate may be used to replenish a bath without regard to feed ratios of separate pigment paste and emulsion components. In a pigmented concentrate, high solids is necessary to forestall pigment settling.

The electrodeposition pigmented concentrate contains conventional pigments such as titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or, preferably, a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included. Extenders such as clay and anti-corrosion pigments are commonly included.

Nonlimiting examples of coalescing solvents include alcohols, polyols and ketones. Specific coalescing solvents include monobutyl and monohexyl ethers of ethylene glycol, and phenyl ether of propylene glycol, monoalkyl ethers of ethylene glycol such as the monomethyl, monoethyl, monopropyl, and monobutyl ethers of ethylene glycol; dialkyl ethers of ethylene glycol such as ethylene glycol dimethyl ether; or diacetone alcohol. The amount of coalescing solvent is not critical and is generally between about 0 to 15 percent by weight, preferably about 0.5 to 5 percent by weight based on total weight of the resin solids.

The electrodeposition coating compositions used in the invention can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids. Plasticizers are optionally included to promote flow or modify plating properties. Examples are high boiling water immicible materials such as ethylene or propylene oxide adducts of nonyl phenols or bisphenol A. Plasticizes can be used at levels of up to 15 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrodeposition coating composition may be applied on any conductive substrate, such as steel, copper, aluminum, or other metals or metal alloys, preferably to a dry film thickness of 10 to 35 µm. The article coated with the composition of the invention may be a metallic automotive part or body. After application, the coated article is removed from the bath and rinsed with deionized water. The coating may be cured under appropriate conditions, for example by baking at from about 275° F. to about 375° F. for between about 15 and about 60 minutes.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surface and the topcoat enamel or basecoat and clearcoat composite topcoat may be ether waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, 4,546,046, 5,373,069, and 5,474,811. The coatings can be cured by any of the known mechanisms and curing agents, such as a melamine or blocked isocyanate.

The invention is further described in the following example. The example is merely illustrative and does not in any way limit the scope of the invention as described and claimed. All parts are parts by weight unless otherwise noted.

EXAMPLE

An electrocoat emulsion, vacuum stripped of low boiling organic processing solvent and having a nonvolatile content of 39.2% by weight, is continuously circulated through an ultrafiltration system with a spiral-wound membrane, maintaining a temperature in the range of 75-85° F. Circulation is continued until the concentrated electrocoat emulsion is at 49.1% nonvolatile by weight.

The permeate collected is passed through a reverse osmosis system to concentrate the organic components of the permeate. The concentrated organic components are re-introduced into the concentrated electrocoat emulsion.

To the concentrated electrocoat emulsion is added a pigment dispersion to obtain a pigment-to-binder ratio of 0.18 in a pigmented electrocoat concentrate.

The description is merely exemplary in nature and, thus, variations that do not depart from the gist of the disclosure are a part of the invention. Variations are not to be regarded as a departure from the spirit and scope of the disclosure.

What is claimed is:

1. A method of preparing an electrocoat coating composition concentrate, comprising
   forming an aqueous emulsion comprising a film-forming component and water;
   removing at least a portion of the water from the aqueous emulsion by ultrafiltration to form the electrocoat coating composition concentrate.

2. A method according to claim 1, wherein the film-forming component comprises a member selected from the group consisting of epoxy resins and acrylic resins.

3. A method according to claim 1, wherein removing at least a portion of the water from the aqueous emulsion by ultrafiltration produces an electrocoat coating composition concentrate having 40 to 55 percent by weight nonvolatiles.

4. A method of preparing an electrocoat coating composition concentrate, comprising
   forming an aqueous emulsion comprising a film-forming component and a volatile organic compound;
   stripping at least a portion of the volatile organic compound from the aqueous emulsion by distillation; and
   removing at least a portion of the water from the stripped aqueous emulsion by ultrafiltration.

5. A method of preparing an electrocoat coating composition concentrate according to claim 4, wherein the film forming component comprises a resin or polymer with basic groups that are at least partially neutralized with an acid or with quaternary groups.

6. A method of preparing an electrocoat coating composition concentrate according to claim 4, wherein the film forming component comprises a resin or polymer with anionic groups that are at least partially neutralized with amine.

7. A method of preparing an electrocoat coating composition concentrate according to claim 4, wherein the ultrafiltered aqueous emulsion is incorporated into an electrocoat bath.

8. A method of preparing an electrocoat coating composition concentrate according to claim 4, wherein a pigment is added following the ultrafiltration step.

9. A method of preparing an electrocoat coating composition concentrate according to claim 4, wherein the aqueous emulsion comprises a crosslinking agent.

10. A method according to claim 4, wherein removing at least a portion of the water from the stripped aqueous emulsion by ultrafiltration produces an electrocoat coating composition concentrate having 40 to 55 percent by weight nonvolatiles.

11. A method of preparing an electrocoat coating composition concentrate according to claim 4, wherein the step of removing water by ultrafiltration produces a permeate comprising water and a higher boiling organic compound or organic salts or both, and wherein the method further comprises separating the higher boiling organic compound or organic salts or both by reverse osmosis of the permeate and adding the separated higher boiling organic compound or organic salts or both back to the aqueous emulsion.

\* \* \* \* \*